United States Patent [19]

Lee et al.

[11] Patent Number: 5,780,948
[45] Date of Patent: Jul. 14, 1998

[54] VIBRATORY STRUCTURE, METHOD FOR CONTROLLING NATURAL FREQUENCY THEREOF AND SENSOR AND ACTUATOR ADOPTING THE VIBRATORY STRUCTURE

[75] Inventors: Ki Bang Lee, Seoul; Young-ho Cho, Daejeon; Ci-moo Song, Sungnam, all of Rep. of Korea

[73] Assignees: Samsung Electronics Co., Ltd., Suwon; Korea Advanced Institute of Science and Technology, Taejon, both of Rep. of Korea

[21] Appl. No.: 731,964

[22] Filed: Oct. 23, 1996

[30] Foreign Application Priority Data

Oct. 28, 1995 [KR] Rep. of Korea .............. 95-37779

[51] Int. Cl.6 ........................................... H02K 07/06
[52] U.S. Cl. ................ 310/81; 310/20; 310/36; 310/37; 310/80; 310/309; 310/316; 310/328
[58] Field of Search ........................ 310/20, 36, 37, 310/80, 81, 309, 316, 328

[56] References Cited

U.S. PATENT DOCUMENTS

| | | | |
|---|---|---|---|
| 4,218,631 | 8/1980 | Yamaguchi | 310/312 |
| 4,710,656 | 12/1987 | Studer | 310/51 |
| 4,816,707 | 3/1989 | Vanderlaan | 310/36 |
| 5,026,341 | 6/1991 | Giebeler | 494/82 |
| 5,118,086 | 6/1992 | Stevenson et al. | 267/70 |
| 5,235,240 | 8/1993 | Morita et al. | 310/365 |
| 5,497,861 | 3/1996 | Brotz | 188/267 |

*Primary Examiner*—Steven L. Stephan
*Assistant Examiner*—Elvin G. Enap
*Attorney, Agent, or Firm*—Burns, Doane, Swecker & Mathis, L.L.P.

[57] ABSTRACT

A vibratory structure and a method for controlling the natural frequency thereof are provided. The vibratory structure has an elastic member one end portion of which is fixed to a first support end, an inertial object for vibrating by the elastic force of the elastic member, a moving electrode attached integrally to the inertial object, an effective stiffness controlling electrode fixed to a second support end, and a power supplier for generating electric force between the moving electrode and the effective stiffness controlling electrode. The moving electrode and the effective stiffness controlling electrode are formed into a predetermined shape, so that the electric force varies linearly according to the displacement of the inertial object. Thus, the natural frequency of the vibratory structure is controlled by changing the voltage applied across the moving electrode and the effective stiffness controlling electrode.

13 Claims, 11 Drawing Sheets

VIBRATORY STRUCTURE, METHOD FOR CONTROLLING NATURAL FREQUENCY THEREOF AND SENSOR AND ACTUATOR ADOPTING THE VIBRATORY STRUCTURE

BACKGROUND OF THE INVENTION

The present invention relates to a vibratory structure and a method for controlling the natural frequency thereof, and more particularly, to a vibratory structure, a method for controlling the frequency thereof, and a sensor and an actuator adopting the vibratory structure. Electric force generated in a vibration system linearly varies with the displacement of an inertial object by forming a moving electrode and an effective stiffness controlling electrode having predetermined shapes. The natural frequency of the vibratory structure can be controlled according to an application of voltage.

The vibratory structure has been recently used in various purposes, for example, for a gyroscope, a sensor like an accelerometer, or an actuator. Among such exemplary applications, the gyroscope has long been used as a core part of a navigation apparatus for missiles, sea-going vessels or aircraft. A conventional gyroscope for military or aeronautical uses, which is fabricated with a multitude of parts through precision processing and assembly, provides a precise performance. However, costly manufacturing processes and cumbersome sizes make these conventional gyroscopes unapplicable to industrial or home-use electronic appliances. A gyroscope for private use demands is currently used in a navigation apparatus for an automobile to detect its acceleration and angular velocity, or in a camcorder of a high magnification to detect and correct hand quivering. Also, a sensor including a vibratory structure is used in medical equipment and industrial instruments.

FIG. 1A shows a simplified vibration system. A vibratory structure 10 is comprised of a spring 12 supported by a support end 13 and an inertial object 11. When the vibratory structure 10 has multiple degrees of freedom, an equivalent vibration system can be constituted of several connected vibratory structures shown in FIG. 1A. Since the mass m of the inertial object 11 and the spring constant k of the spring 12 are constant, this vibratory structure 10 has a constant natural frequency relative to an amplitude, as shown in FIG. 1B.

Accordingly, once a sensor or an actuator adopting the above vibratory structure 10 is manufactured, it is difficult to freely alter the natural frequency of the vibratory structure. Though a metal such as silver can be deposited during fabrication of the vibratory structure to control the natural frequency, as disclosed in U.S. Pat. No. 4,107,349, the deposition itself is difficult to perform and an additional process for controlling the natural frequency is required after the fabrication of a vibration system.

To solve the above problems, the present applicant has proposed a solution in which an effective stiffness controlling electrode and a power supplier are provided to a vibration system and power applied to the effective stiffness controlling electrode is varied, thereby controlling a natural frequency. That is, the natural frequency of the vibration system is controlled by using an inertial object as a moving electrode and applying a voltage between the moving electrode and the effective stiffness controlling electrode fixed to a support end in the vibration system, and thus generating electric force. The natural frequency of the vibration system may be increased or decreased by changing the magnitude of the voltage.

The control of the natural frequency in the vibration system by using the effective stiffness controlling electrode is based on the assumption that the vibration scope of the inertial object is infinitesimal. While elastic force applied to the vibration system can be expressed substantially as a linear function with a constant inclination, the electric force applied to the vibration system via the effective stiffness controlling electrode is expressed as a non-linear function with respect to the displacement of the inertial object. This is because the electric force applied to the vibration system is generated between the moving electrode, i.e., the inertial object, and the effective stiffness controlling electrode and, accordingly, the volume of the electric force varies with the vibration displacement of the moving electrode. Hence, the natural frequency control is possible by regulating voltage magnitude only in a vibration system based on the assumption of the infinitesimal vibration displacement. However, it is impossible to control the natural frequency when the vibration displacement is too great to accept the above assumption.

SUMMARY OF THE INVENTION

To solve the above problems, it is an object of the present invention to provide a vibratory structure having an effective stiffness controlling electrode or a moving electrode, which is formed into a shape to generate a linear electric force according to the vibratory displacement of an inertial object.

It is another object of the present invention to provide a method for controlling the natural frequency of a vibratory structure by forming an effective stiffness controlling electrode or a moving electrode of a vibration system into a predetermined shape, in order to generate a linear electric force according to the vibratory displacement of an inertial object.

It is still another object of the present invention to provide a sensor having the effective stiffness controlling electrode or the moving electrode.

It is a further object to provide an actuator having the effective stiffness controlling electrode or the moving electrode.

To achieve the first object, there is provided a vibratory structure comprising: an elastic member one end portion of which is connected to a first support end; an inertial object for vibrating by the elastic force of the elastic member; a moving electrode formed into a first predetermined shape and attached to the inertial object; an effective stiffness controlling electrode connected to a second support end and formed into a predetermined shape; and a power supplier for generating electric force between the moving electrode and the effective stiffness controlling electrode, wherein the electric electrode force linearly varies according to the displacement of the inertial object.

The moving electrode and the effective stiffness controlling electrode are shaped into fingers and inserted with each other according to the vibration of the inertial object, the effective stiffness controlling electrode is curved for a length of $x_1$ from the second support end and linear from the end of the curved portion to the end portion of the effective stiffness controlling electrode, and wherein with respect to the displacement x of the inertial object, the distance s between the moving electrode and the curved portion of the effective stiffness controlling electrode is given by $$s = s_0 \frac{1}{1 + \left( \frac{s_0}{s_1} - 1 \right) \frac{x}{x_1}},$$

where $s_0$ indicates the distance between the moving electrode and the linear portion of the effective stiffness controlling electrode, and $s_1$ denotes the distance between the effective stiffness controlling electrode on the second support end and the moving electrode.

The moving electrode is shaped into a rod having a radius of $r_1$ and the effective stiffness controlling electrode is shaped into a cylinder which is hollow and has an annular section, the moving electrode is inserted into the effective stiffness controlling electrode according to the vibration of the inertial object, and wherein with respect to the displacement x of the inertial object, the difference s between the radius of the inner hollow circle of the effective stiffness controlling electrode and the radius $r_i$ of the moving electrode is given by $$s = \frac{1}{\left( \frac{1}{s_1} - \frac{1}{s_0} \right) \frac{x}{x_1} + \frac{1}{s_0}}.$$

where $x_1$ indicates the whole length of the effective stiffness controlling electrode and $s_0$ and $s_1$ indicate the differences between the radius $r_1$ of the moving electrode and radii of the inner hollow circle of the effective stiffness controlling electrode on the end portion thereof and on the second support end, respectively.

The moving electrode and the effective stiffness controlling electrode each are shaped into a plurality of fingers and inserted with each other according to the vibration of the inertial object, each finger of the effective stiffness controlling electrode is of the same length, and the fingers of the moving electrode are shaped so that the end portions of the fingers are in a straight line, and linearly symmetrical with respect to the longitudinal direction of the longest finger of the moving electrode.

The moving electrode and the effective stiffness controlling electrode are shaped into plates and detached by a predetermined distance from each other in parallel, and the moving electrode overlaps with the effective stiffness controlling electrode in a triangle according to the displacement of one of the inertial object and the moving electrode.

The moving electrode overlaps with the effective stiffness controlling electrode in an isosceles triangle.

The inertial object is a plate having at least one slit, the effective stiffness controlling electrode is a plate, the inertial object is detached in parallel from the effective stiffness controlling electrode by a predetermined distance, and the inertial object overlaps with the effective stiffness controlling electrode in a triangle.

The inertial object is a plate having at least one slit, the effective stiffness controlling electrode is a plate, the inertial object is detached in parallel from the effective stiffness controlling electrode by a predetermined distance, and the slit of the inertial object overlaps with the effective stiffness controlling electrode in a triangle.

The moving electrode includes a plurality of fingers each having a triangular end portion, and detached from one another by a predetermined distance, the effective stiffness controlling electrode includes a plurality of fingers and detached from one another by a predetermined distance, and the fingers of the moving electrode and the effective stiffness controlling electrode are mutually inserted according to the displacement of the moving electrode.

To achieve the second object, there is provided a method for controlling the natural frequency of a vibratory structure comprising: an elastic member one end portion of which is connected to a first support end; an inertial object for vibrating by the elastic force of the elastic member; a moving electrode formed into a first predetermined shape and attached to the inertial object; an effective stiffness controlling electrode connected to a second support end and formed into a predetermined shape; and a power supplier for generating electric force between the moving electrode and the effective stiffness controlling electrode, wherein the electric force linearly varies according to the displacement of the inertial object, and thus the natural frequency of the vibratory structure is controlled by changing the voltage applied between the moving electrode and the effective stiffness controlling electrode.

To achieve the third object, there is provided a sensor including at least one vibratory structure, the vibratory structure comprising: an elastic member one end portion of which is connected to a first support end; an inertial object for vibrating by the elastic force of the elastic member; a moving electrode formed into a first predetermined shape and attached to the inertial object; an effective stiffness controlling electrode connected to a second support end and formed into a predetermined shape; and a power supplier for generating electric force between the moving electrode and the effective stiffness controlling electrode, wherein the electric force linearly varies according to the displacement of the vibratory structure is controlled by changing the voltage applied between the moving electrode and the effective stiffness controlling electrode.

To achieve the fourth object, there is provided an actuator including at least one vibratory structure, according to an embodiment of the present invention, the vibratory structure comprising: an elastic member one end portion of which is connected to a first support end; an inertial object for vibrating by the elastic force of the elastic member; a moving electrode formed into a first predetermined shape and attached to the inertial object; an effective stiffness controlling electrode connected to a second support end and formed into a predetermined shape; and a power supplier for generating electric force between the moving electrode and the effective stiffness controlling electrode.

According to a first embodiment of the present invention, there is provided an actuator comprising: an elastic member one end of which is connected to a support end; an inertial object for vibrating by the elastic force of the elastic member; means for vibrating the inertial object and detecting the vibration of the inertial object; a moving electrode formed into fingers at one side of the inertial object; an effective stiffness controlling electrode formed into fingers to be inserted with the moving electrode; and a power supplier for applying a voltage to generate electric force between the moving electrode and the effective stiffness controlling electrode, wherein the electric force linearly varies according to the displacement of the inertial object.

According to a second embodiment of the present invention, there is provided an actuator comprising: an elastic member one end portion of which is supported by a support end; an inertial object formed into a plate, for vibrating by the elastic force of the elastic member and having at least one slit; means for exciting the inertial object and detecting the vibration of the inertial object; at least one effective stiffness controlling electrode formed into a plate, detached in parallel from the plate inertial object by a predetermined distance, and always overlapping with the inertial object in a triangle; and a power supplier for applying a predetermined voltage between the inertial object and the effective stiffness controlling electrode.

According to a third embodiment of the present invention, there is provided an actuator comprising: an elastic member one end portion of which is supported by a support end; an inertial object shaped into a circular plate and having at least one slit, for rotating by the elastic force of the elastic member; means for exciting the inertial object and detecting the vibration of the inertial object; and at least one effective stiffness controlling electrode detached in parallel from the inertial object by a predetermined distance, and overlapping with the inertial object in a triangle.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 1A:
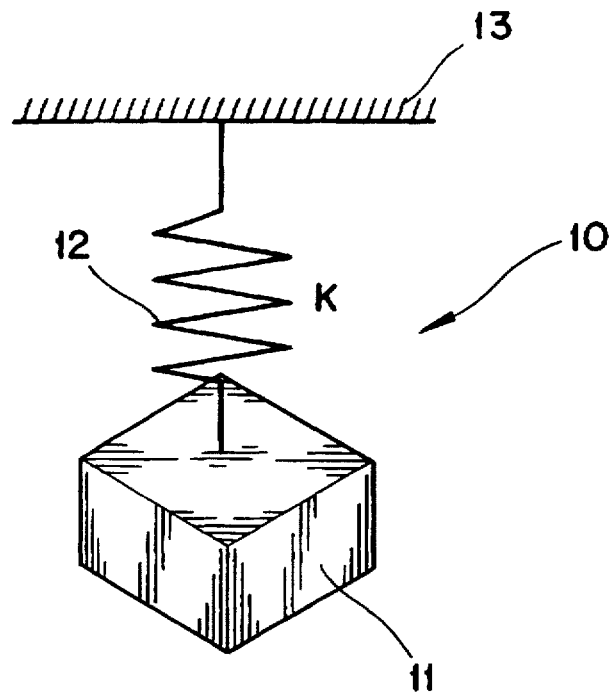
FIG. 1A is a schematic view of a conventional simplified vibration system.
Figure 1B:
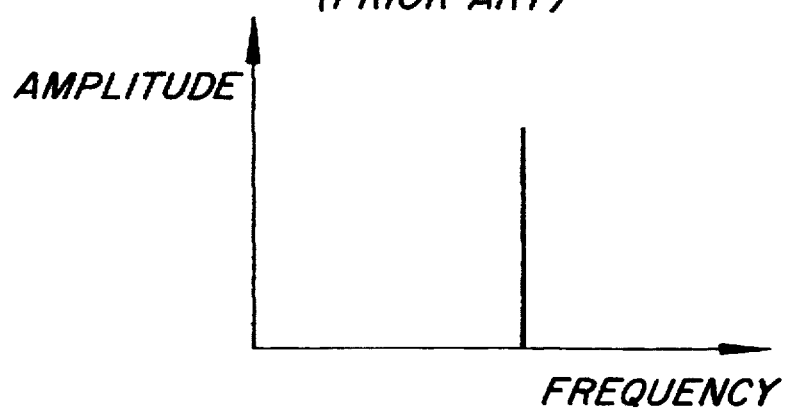
FIG. 1B is a graph showing the natural frequency of the vibratory structure shown in FIG. 1A.
Figure 2A:
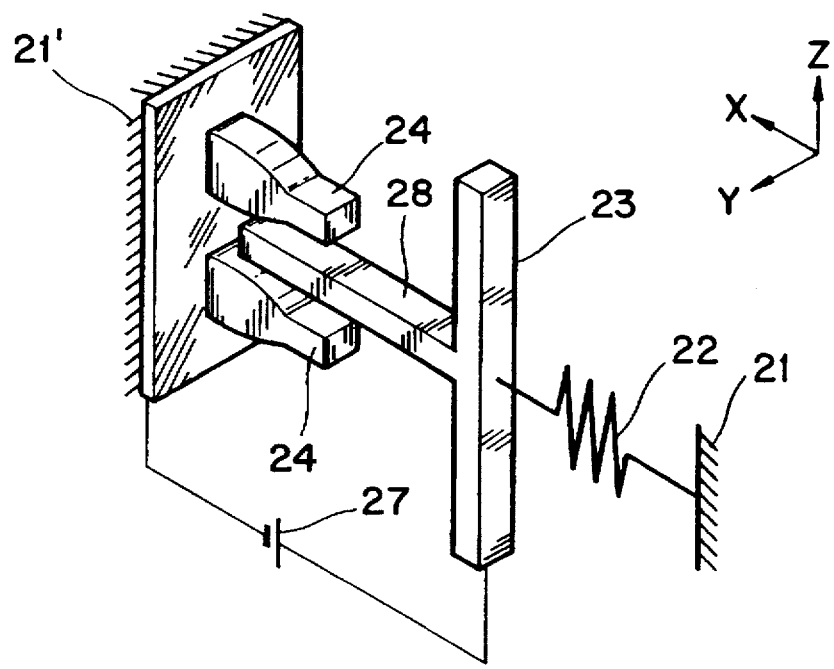
FIG. 2A is a schematic view of a vibratory structure according to a first embodiment of the present invention.

FIG. 2A illustrates a vibratory structure employing an effective stiffness controlling electrode of a predetermined shape to apply a linear electric force to a vibration system, according to a first embodiment of the present invention.

In FIG. 2A, an inertial object 23 moves in an X-axis direction on an X-Z plane by the elastic force of an elastic member 22 supported by a first support end 21. A moving electrode 28 is formed into a finger-like appendage, integrally with the inertial object 23. Effective stiffness controlling electrodes 24 are also formed into fingers and fixed to a second support end 21' to apply electric force to the inertial object 23.

According to a characteristic of the present invention, the effective stiffness controlling electrodes 24 and the moving electrode 28 have predetermined shapes, which will be later described in detail. The moving electrode 28 is inserted between the effective stiffness controlling electrodes 24, with a predetermined distance between the moving electrode 28 and each effective stiffness controlling electrode 24. A power supplier 27 applies a voltage to the effective stiffness controlling electrodes 24 and the moving electrode 28. The electric force of the electrodes as well as the elastic force of the elastic member 22 is applied to the inertial object 23.

Figure 2B:
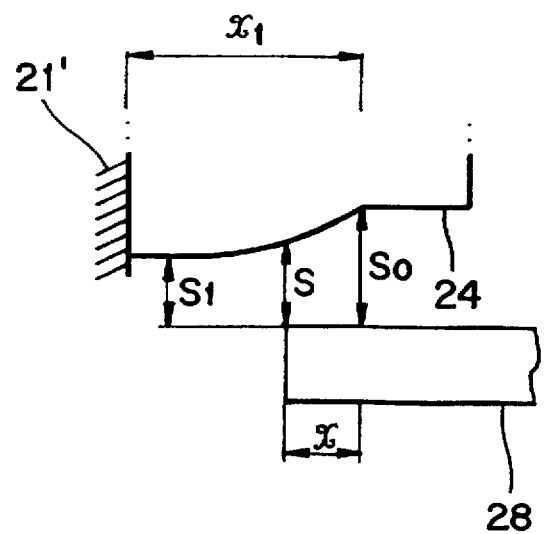
FIG. 2B is a front view of a part of the vibratory structure shown in FIG. 2A.

FIG. 2B is a front view of portions of the effective stiffness controlling electrodes 28 and the moving electrode 24 shown in FIG. 2A.

In FIG. 2B, each of the effective stiffness controlling electrodes 24 is curved for a length of $x_1$ from the support end 21' and linear from the end of the curved portion to the end portion. Reference character s is a variable indicating the distance between the moving electrode 28 and the curved portion of the effective stiffness controlling electrode 24, reference character $s_0$ indicates the distance between the moving electrode 28 and the linear portion of the effective stiffness controlling electrode 24, and reference character $s_1$ indicates the distance between the effective stiffness controlling electrode 24 on the second support end 21' and the moving electrode 28. s can be given as a function with respect to the displacement x of the inertial object 23. That is, $$s = s_0 \left[ \frac{1}{1 + \frac{x}{x_1} \left( \frac{s_0}{s_1} - 1 \right)} \right] \quad (1)$$

When the moving electrode 28 moves for an infinitesimal distance dx, an increase in the capacitance dc between the moving and effective stiffness controlling electrodes 28 and 24 and the rate dc/dx of an entailing change in the capacitance are given by $$dc = \frac{\epsilon dA}{s}$$

$$= \frac{\epsilon t}{s} dx$$

$$\frac{dc}{dx} = \frac{\epsilon t}{s}$$

where $\epsilon$ indicates the dielectric constant of the space between the moving electrode 28 and the effective stiffness controlling electrode 24, and t is the finger length along a Y-axis. With a voltage provided from the power supplier 27 given as V, the electric force F between both the electrodes is as follows $$F = \frac{1}{2} \left( \frac{dc}{dx} \right) V^2 \quad (1)$$

$$= \frac{1}{2} \left[ 1 + \frac{x}{x_1} \left( \frac{s_0}{s_1} - 1 \right) \right] \left( \frac{\epsilon t}{s_0} \right) V^2$$

As is noted from the above equation, since the electric force F between the moving electrode 28 and the effective stiffness electrode 24 increases in proportion to the displacement x of the inertial object 23 on condition that the voltage V is constant, the electric force is linear with respect to the distance.

Figure 2C:
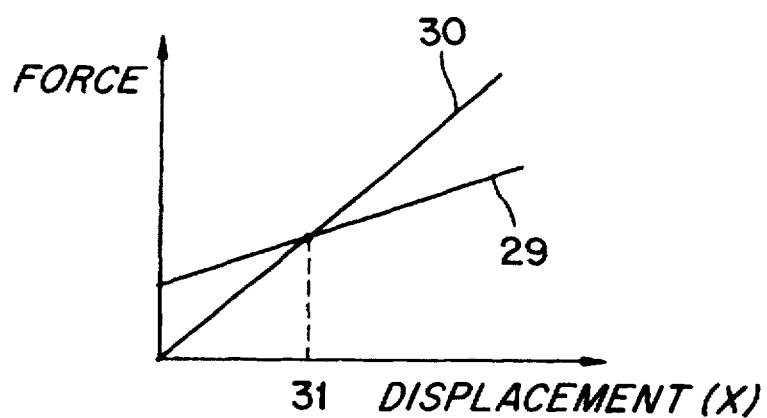
FIG. 2C is a graph showing elastic force and electric force depending on the displacement of the inertial object in the vibratory structure of FIG. 2A.

FIG. 2C is a graph of the electric and elastic forces generated when the displacement of the inertial object 23 in the vibration system of FIG. 2A is x. Straight lines 29 and 30 of predetermined inclinations indicate the electric force and the elastic force, respectively, and both the lines are in equilibrium at a predetermined position 31. In FIG. 2C, the result obtained by subtracting the inclination of the straight line 29 from that of the straight line 30 can be considered as the effective stiffness of the entire vibration system. The effective stiffness $k_{eff}$ is calculated by $$k_{eff} = k - \frac{1}{2}\left(\frac{s_0}{s_1} - 1\right)\left(\frac{\epsilon t}{s_0 x_1}\right)V^2$$

Figure 2D:
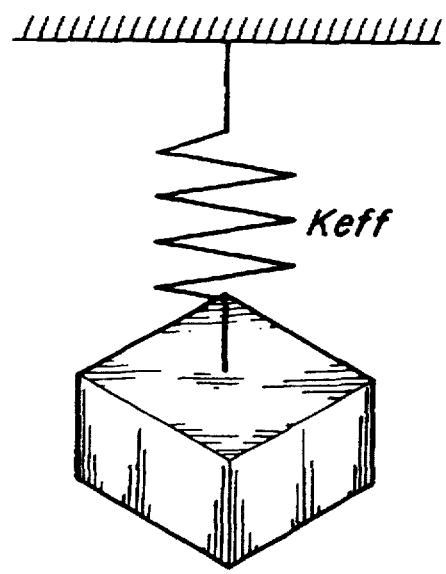
FIG. 2D is a schematic view of an equivalent vibratory structure to that of FIG. 2A.

It is inferred from the above equation that the effective stiffness of the vibration system is proportional to the square of the voltage. When the voltage is constant, the effective stiffness is also constant. A simple vibratory structure having the equivalent effective stiffness $k_{eff}$ can serve as this vibration system, as shown in FIG. 2D. The natural frequency $f_n$ of the vibration system is calculated by $$f_n = \frac{1}{2\pi}\sqrt{\frac{k_{eff}}{m}}$$

$$= \frac{1}{2\pi}\sqrt{\frac{k}{m}\left[1 - \frac{1}{2}\left(\frac{s_0}{s_1} - 1\right)\left(\frac{\epsilon t}{s_0 x_1 k}\right)V^2\right]}$$

Thus, the natural frequency can be controlled with the voltage by using the above equation.

Figure 3:
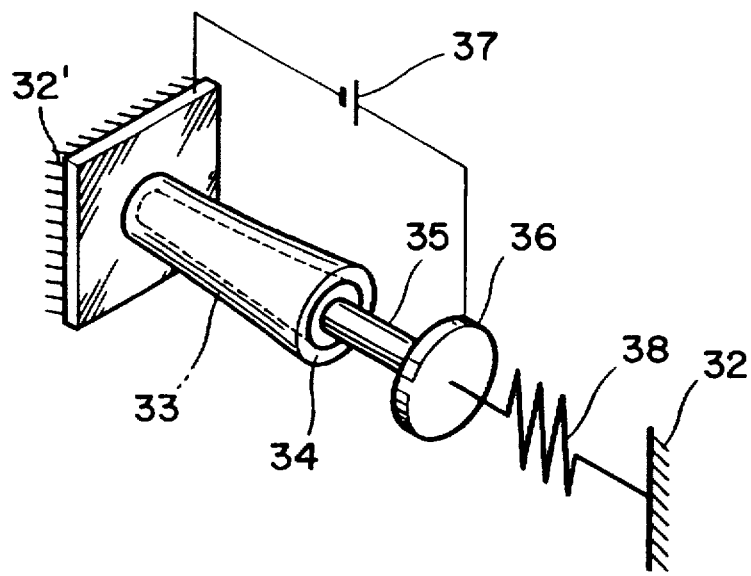
FIG. 3 is a schematic view of a vibratory structure according to a second embodiment of the present invention.

FIG. 3 illustrates a vibratory structure having a cylindrical effective stiffness controlling electrode and a rod-shaped moving electrode which is inserted into the effective stiffness controlling electrode, according to a second embodiment of the present invention.

In FIG. 3, an inertial object 36 is supported by a first support end 32 via an elastic member 38, and a rod-shaped moving electrode 35 is formed integrally with the inertial object 36. The section of the moving electrode 35 is a circle of a radius $r_i$. An effective stiffness controlling electrode 33, one end portion of which is fixed to a second support end 32', is hollow so that the moving electrode 35 is inserted into the effective stiffness controlling electrode 33. The section of the effective stiffness controlling electrode 33 is annular. The diameter varies along the length of the effective stiffness controlling electrode 33 in order to linearly alter the electric force produced between both the electrodes depending on the displacement of the inertial object 36.

In FIG. 3, the difference s between the radius of the inner hollow circle of the effective stiffness controlling electrode 33 and the sectional radius $r_i$ of the moving electrode 35 is given by $$s = \frac{1}{\left(\frac{1}{s_1} - \frac{1}{s_0}\right)\frac{x}{x_1} + \frac{1}{s_0}}$$

where x indicates the displacement of the inertial object 36, $x_1$ indicates the entire length of the effective stiffness controlling electrode 33, $s_0$ indicates the difference between the inner diameter of an end portion 34 of the effective stiffness controlling electrode 33 and the diameter of the moving electrode 35, and $s_i$ indicates the difference between the inner diameter of the effective stiffness controlling electrode 33 on the second support end 32' and the diameter of the moving electrode 35.

The same conclusion as that derived from the vibration system of FIG. 2A can be obtained from the above equation. That is, in a vibration system having the hollow cylindrical effective stiffness controlling electrode 33 meeting the above equation, electric force also varies linearly with the displacement of the inertial object 36. Thus, the natural frequency of the vibration system can be controlled only with the variation of a voltage applied to the effective stiffness controlling electrode 33 by a power supplier 37. The effective stiffness $k_{eff}$ of the vibration system shown in FIG. 3 is expressed as $$k_{eff} = k - \pi\epsilon\left(\frac{r_i}{x_1}\right)\left(\frac{1}{s_1} - \frac{1}{s_0}\right)V^2$$

Figure 4:
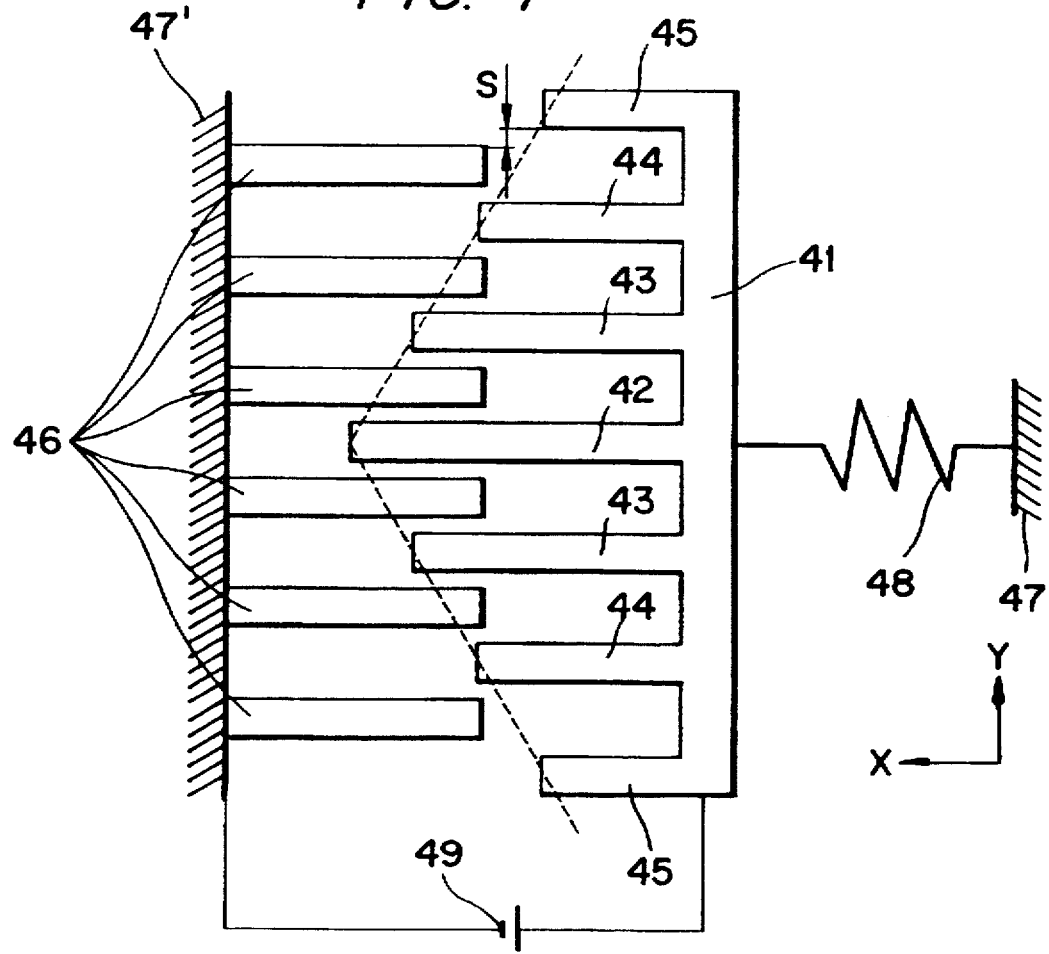
FIG. 4 is a schematic view of a vibratory structure according to a third embodiment of the present invention.

FIG. 4 illustrates a vibratory structure according to a third embodiment of the present invention, in which electric force linearly varies with the displacement of an inertial object.

In FIG. 4, an inertial object 41 is supported by a first support end 47 via an elastic member 48, and finger-shaped moving electrodes 42–45 are formed integrally with the inertial object 41. The moving electrodes 42–45 are arranged in such a way that the end portions of the moving electrodes 42 to 45 are in a straight line. Assuming that the point where the moving electrode 42 meets the inertial object 41 is the basis, the length of the moving electrodes 42–45 is a variable l, the length of the inertial object 41 is along the Y-axis, the length of the shortest moving electrodes 45 is b, and the inclination of the line connecting the end portions of the moving electrodes 42–45 is a, then, l=ay+b. Further, if the pitch between fingers is p, the difference between the lengths of adjacent fingers is ap. For instance, the length of the moving electrodes 45 is b, and the length of the moving electrodes 44 is b+ap.

Effective stiffness controlling electrodes 46 are shaped into fingers of the same length and supported by a second support end 47'. The effective stiffness controlling electrodes 46 are engaged with the moving electrodes 42–45. Electric force applied to this vibration system depends only on the number of the fingers engaged. With the distance s between fingers, the thickness t of a finger, and a voltage V applied by a power supplier 49, the electric force F is given by $$F = \epsilon\frac{t}{aps}V^2 x$$

The effective stiffness $k_{eff}$ of the vibration system is as follows $$k_{eff} = k - \epsilon\frac{t}{aps}V^2$$

As is known from the above equation, the effective stiffness of the vibration system shown in FIG. 4 is unrelated to the horizontal movement of the inertial object 41, and since the electric force linearly varies with the displacement of the inertial object 41, the natural frequency can be controlled by altering an applied voltage. Also, a similar conclusion can be reached in a case that moving electrodes are of the same length and the length of the effective stiffness controlling electrode 46 is linearly altered.

Figure 5A:
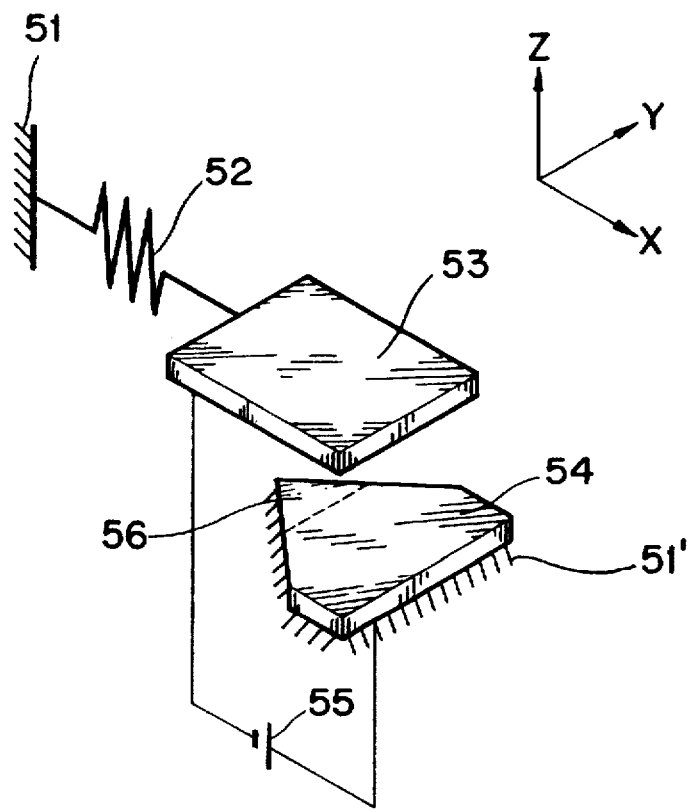
FIG. 5A is a schematic view of a vibratory structure according to a fourth embodiment of the present invention.

FIG. 5A illustrates a vibratory structure according to a fourth embodiment of the present invention, in which electric force linearly varies with the displacement of an inertial object. An inertial object or a moving electrode 53 supported by a first support end 51 via an elastic member 52 is a square plate, and an effective stiffness controlling electrode 54 supported by a second support end 51' is also a plate having a triangular portion. A power supplier 55 applies a voltage across the moving electrode 53 and the effective stiffness controlling electrode 54, thereby generating electric force. The inertial object or the moving electrode 53 makes an X-axis displacement within the triangular portion of the effective stiffness controlling electrode 54.

Figure 5B:
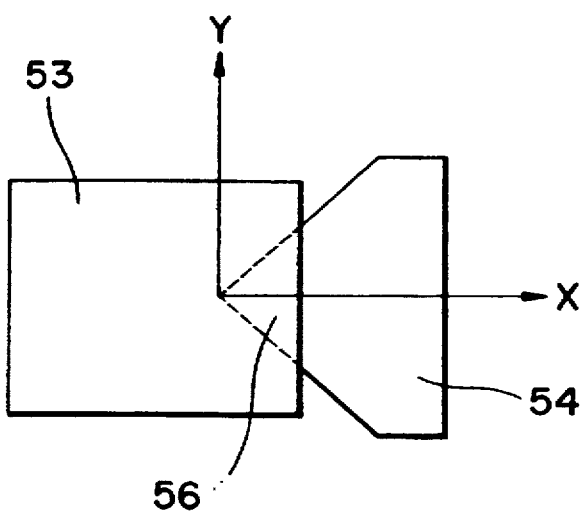
FIG. 5B is a plan view illustrating a part of the vibratory structure of FIG. 5A.

As shown in FIG. 5B, an area 56 in which the moving electrode 53 and the effective stiffness controlling electrode 54 overlap linearly varies with the X-axis displacement of the moving electrode 53. Assuming that the angular point of the triangular portion of the effective stiffness controlling electrode 54 is the basis of a plane coordinate system, the inclination of a side of the triangular is a, and the Z-axis directional distance between the effective stiffness controlling electrode 54 and the moving electrode 53 is h, when a voltage V is applied by the power supplier 55, electrical force F applied along the X-axis is given $$F = a \left( \frac{\epsilon}{h} \right) V^2 x$$

The effective stiffness of the vibration system shown in FIG. 5A can be expressed as $$k_{\mathit{eff}} = k - a \left( \frac{\epsilon}{h} \right) V^2$$

From the above equation, it is noted that the electric force applied to the vibration system linearly varies with the displacement of the moving electrode 53. Thus, the natural frequency can be controlled only with the variation of the applied voltage.

Figure 6:
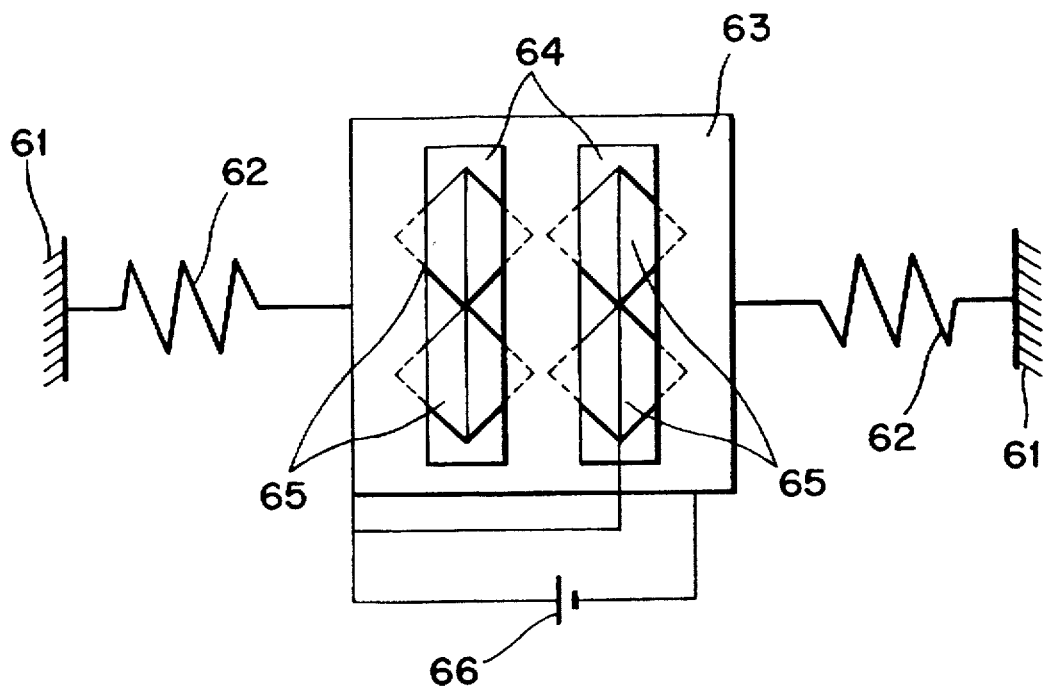
FIG. 6 is a schematic view of a vibratory structure according to a fifth embodiment of the present invention.
Figure 7:
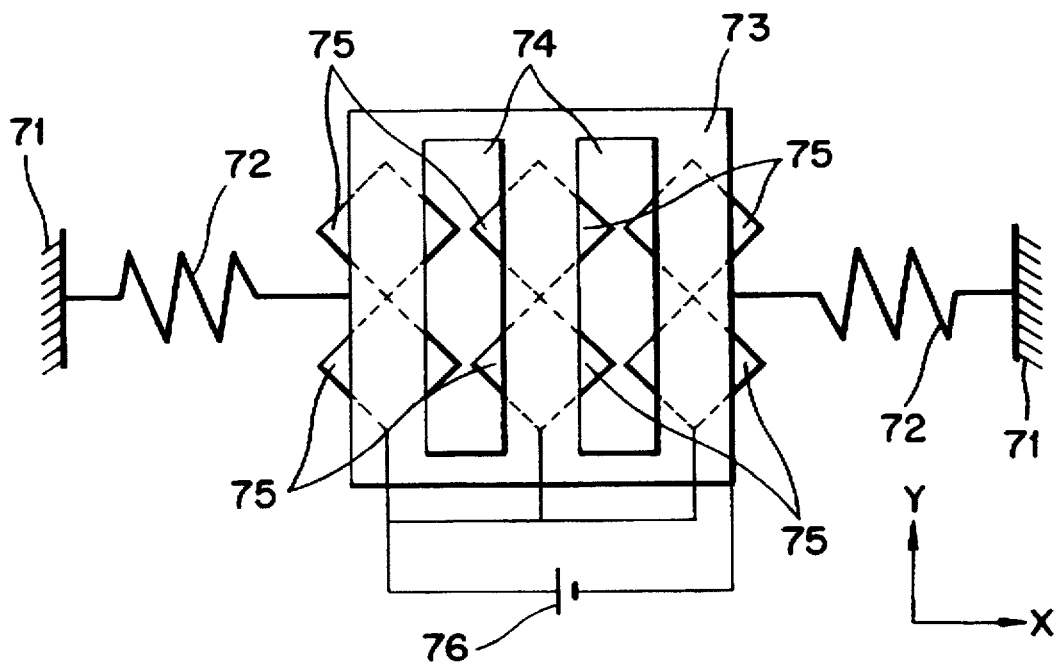
FIG. 7 is a schematic view of a vibratory structure according to a sixth embodiment of the present invention.

FIGS. 6 and 7 illustrate vibratory structures modified from the vibratory structure of FIG. 5A, according to fifth and sixth embodiments of the present invention, respectively.

Referring to FIG. 6, both sides of an inertial object 63 are supported by support ends 61 via elastic members 62, and the inertial object 63 has at least one slit 64. The inertial object 63 is detached from effective stiffness controlling electrodes 65 by a predetermined distance. Each of the effective stiffness controlling electrodes 65 is a square formed of triangles whose base sides contact with each other. The triangles are preferably isosceles triangles. Also, preferably, the bases of the isosceles triangles contact with each other, thereby forming a square. A power supplier 66 applies a voltage between the inertial object 63 and the effective stiffness controlling electrode 65.

In such a vibratory structure, when the inertial object 63 vibrates, the moving electrode 63 overlaps with the effective stiffness controlling electrodes 65 in triangles marked by dotted lines, due to the slits 64 formed in the inertial object 63. Therefore, the electric force applied to the vibration system linearly varies with the displacement of the inertial object 63.

The embodiment of FIG. 7 is similar to that of FIG. 6, except that the triangular portion of an effective stiffness controlling electrodes 75 overlaps with slits 74. In this case, electric force applied to the vibration system linearly varies with the X-axis directional displacement of an inertial object 73. Both sides of the inertial object 73 are supported by support ends 71 via elastic members 72, and the inertial object 73 has at least one slit 74. The inertial object 73 is detached from the effective stiffness controlling electrodes 75 by a predetermined distance. A power supplier 76 applies a voltage between the effective stiffness controlling electrodes 75 and the inertial object 73.

Figure 8:
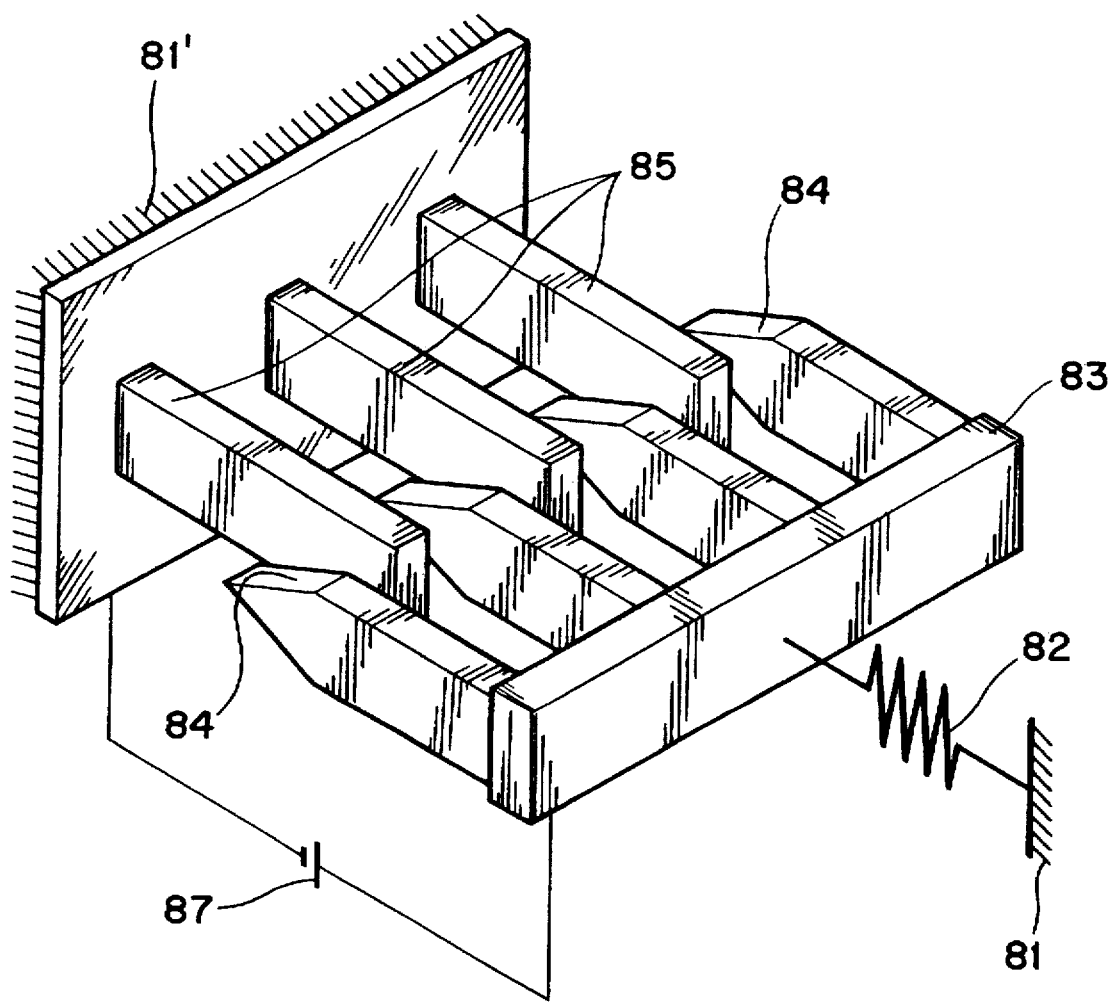
FIG. 8 is a schematic view of a vibratory structure according to a seventh embodiment of the present invention.

The embodiment shown in FIG. 8 is also modified from that of FIG. 5A. An inertial object 83 is fixed to a first support end 81 via an elastic member 82, and a plurality of plate-shaped moving electrodes 84 of the same length are attached to the inertial object 83. The end portions of the moving electrodes 84 are in the form of triangles, and preferably isosceles triangles. A plurality of effective stiffness controlling electrodes 85 of the same length are fixed to a second support end 81'. The effective stiffness controlling electrodes 85 are also plate-shaped, and each can be inserted between the moving electrodes 84 according to the vibration of the inertial object 83. The displacement of the inertial object 83 are preferably limited so that only the end triangular portions of the moving electrodes 84 overlap with the effective stiffness controlling electrodes 85. A power supplier 87 applies a voltage across the effective stiffness controlling electrode 85 and the moving electrodes 84.

Figure 9:
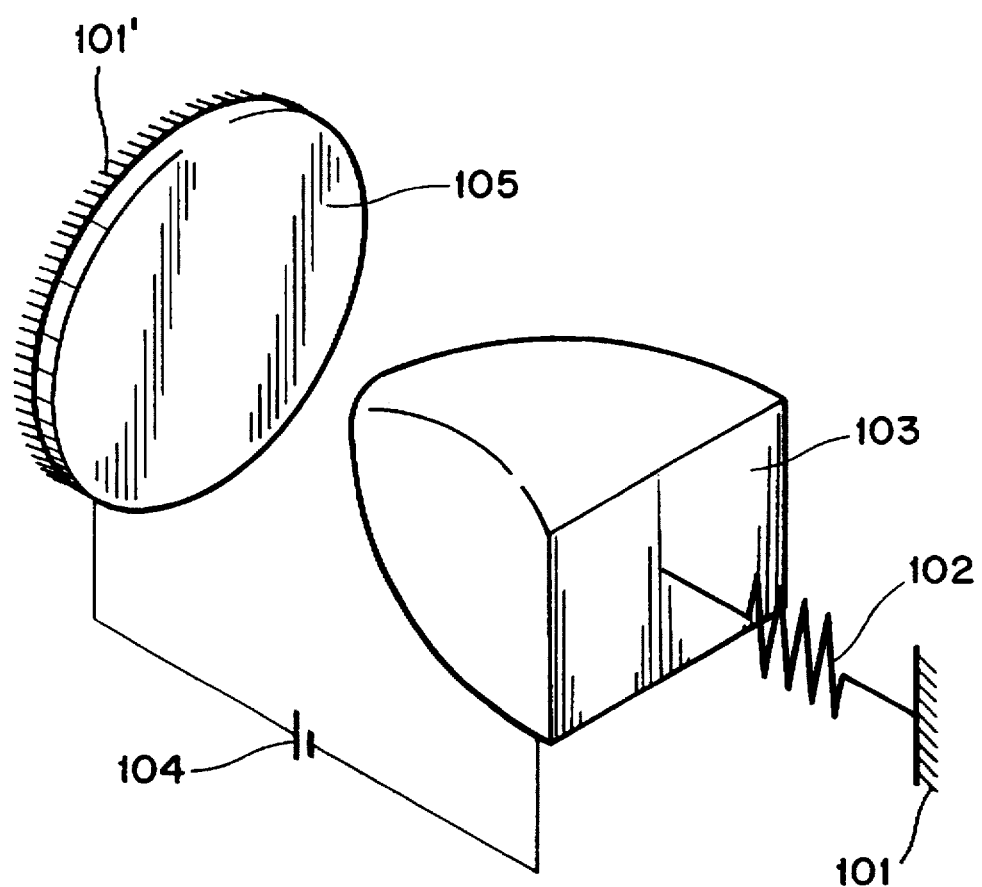
FIG. 9 is a schematic view of a generalized vibratory structure according to the present invention.

FIG. 9 illustrates a vibratory structure generalized from the above described embodiments. This vibratory structure is comprised of an elastic member 102 supported by a first support end 101, an inertial object or a moving electrode 103 fixed to an end portion of the elastic member 102, an effective stiffness controlling electrode 105 fixed to a second support end 101', and a power supplier 104 for applying a voltage. The moving electrode 103 or the effective stiffness controlling electrode 105 should be formed in a predetermined shape to linearly vary electric force generated in the vibration system according to the displacement of the inertial object. Assuming that the capacitance between the moving electrode 103 and the effective stiffness controlling electrode 105 is c, and $c=\alpha s^2+\beta s+\gamma$, the electric force applied between both the electrodes is calculated by $$F = \frac{1}{2} \left( \frac{dc}{ds} \right) V^2$$
$$= \frac{1}{2} (2\alpha s + \beta) V^2$$

where $\alpha$, $\beta$ and $\gamma$ indicate constants, dc/ds indicates the sensitivity of the capacitance between both the electrodes, s indicates the distance between both the electrodes according to their relative movements, and V indicates an applied voltage. As is noted from the above equation, the electric force linearly varies with the distance s between the electrodes, when the applied voltage V is constant.

The effective stiffness of this vibration system is expressed as $$k_{\mathit{eff}} = k - \alpha V^2$$

From the above equation, since the effective stiffness of this vibration system varies with the applied voltage V, the natural frequency of the vibration system can be controlled by changing the magnitude of the applied voltage.

Figure 10:
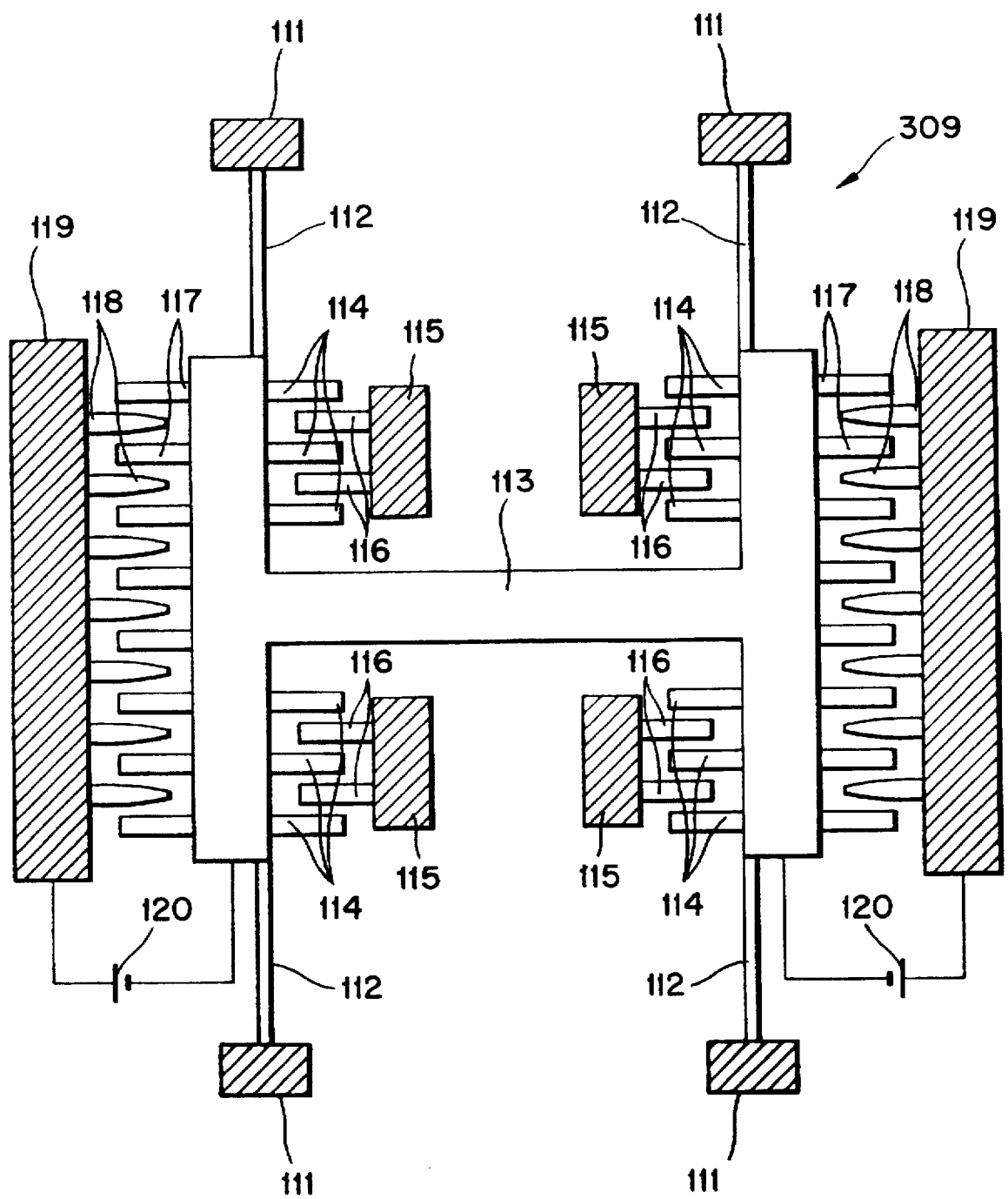
FIG. 10 is a schematic view of a first embodiment of an actuator adopting a vibratory structure of the present invention.
Figure 11:
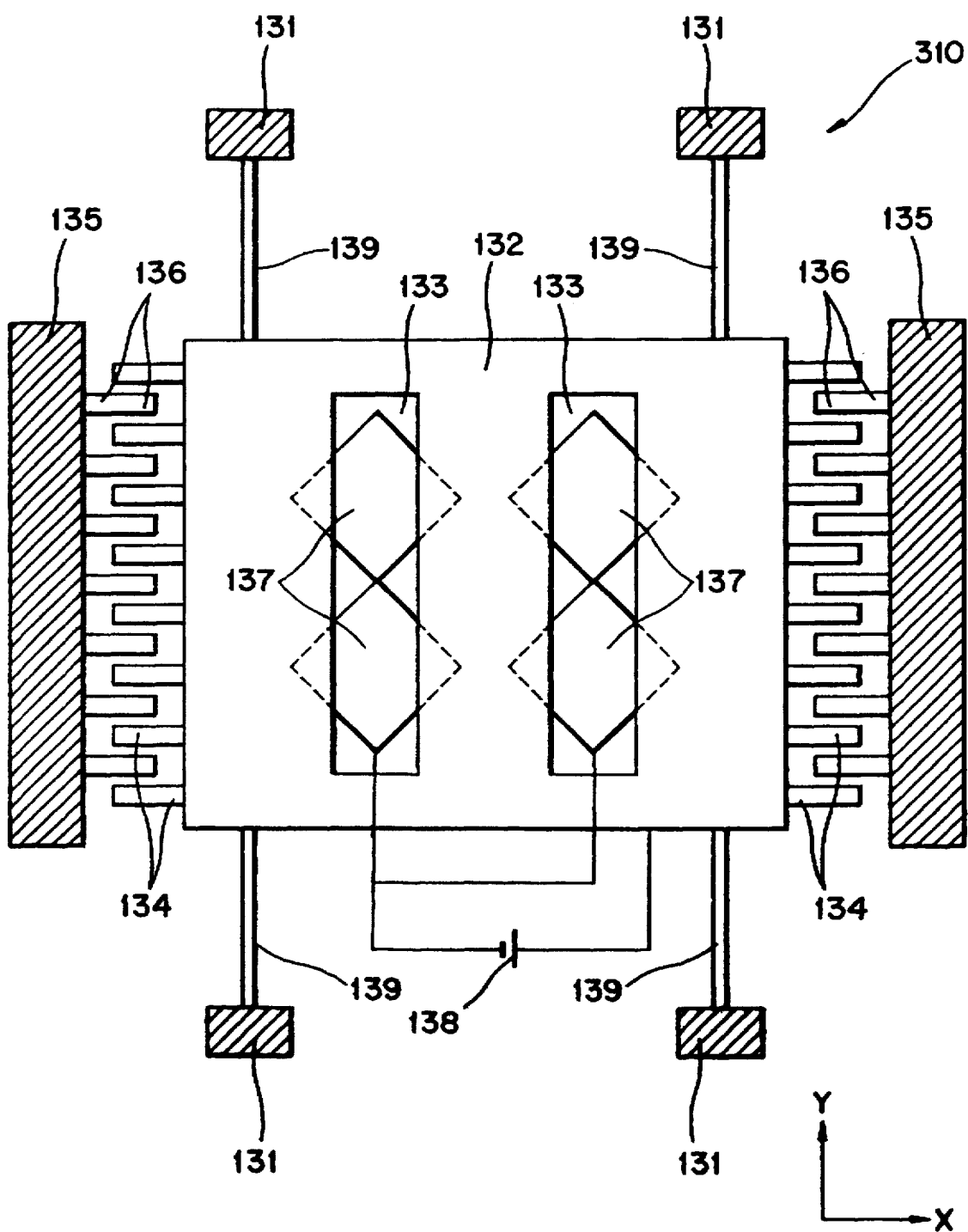
FIG. 11 is a schematic view of a second embodiment of an actuator adopting a vibratory structure of the present invention.
Figure 12:
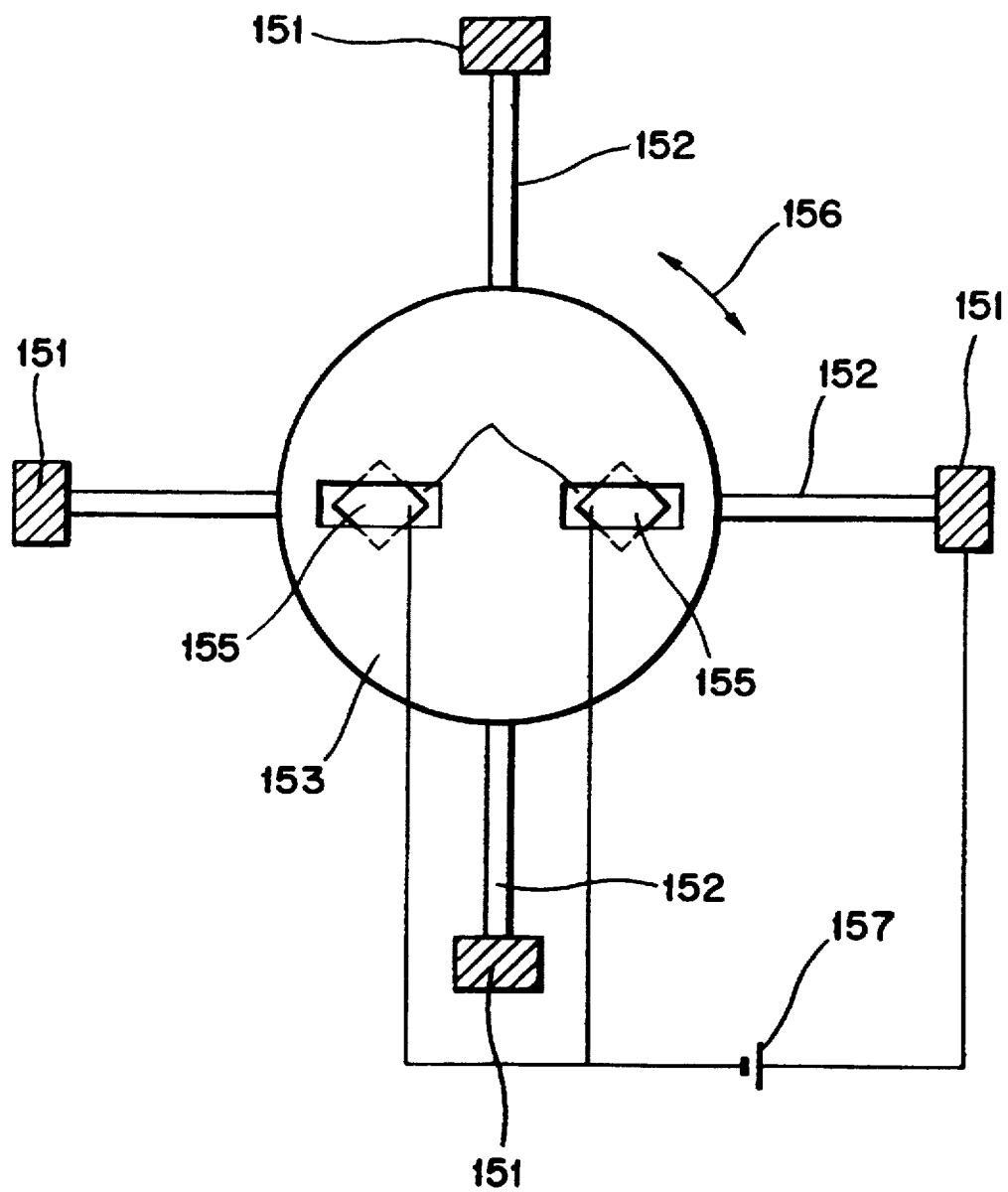
FIG. 12 is a schematic view of a rotary actuator adopting a vibratory structure of the present invention.

FIGS. 10–12 illustrate actuators for controlling the resonant frequency of a vibration system by means of a voltage according to embodiments of the present invention. This vibration system can be used for controlling the natural frequency of a vibratory structure which vibrates in various directions, and for a resonant sensor. These vibratory structures are fabricated on silicon substrates by a thin film technology.

FIG. 10 is a schematic plane view of an actuator 309. An end portion of an elastic member 112 is supported by a support end 111. From the other end portion of the inertia object 112 is suspended an inertial object 113. The elastic member 113 is kept detached upward from a base substrate (not shown) by a predetermined distance by means of the elastic member 112. Finger-shaped driving electrodes 114 and finger-shaped moving electrodes 117 are formed at the inertia object 113. The inertia object 113 can make a two-dimensional planar movement by an exciter (not shown). The exciter is provided with exciting electrodes 116 formed in an exciting portion 115, and the exciting electrodes 116 are shaped into fingers and inserted between finger-shaped driving electrodes 114 formed in the inertial object 113. When a voltage is applied between the exciting electrodes 116 and the driving electrodes 114, electric force is generated and thus the inertial object 113 vibrates in lateral directions.

The electric force generated between the exciting electrodes 116 and the driving electrodes 114 is constant regardless of the displacement of the inertial object 111. This is the case of $s_0=s_1$ in the Equation 1 above induced from the embodiment of FIG. 2A. The exciting electrodes 116 and the driving electrodes 114 can be used for detecting the state of the two-dimensional vibration of the inertial object 113.

Effective stiffness controlling electrodes 118 are fixed to support ends 119, and the shape of each effective stiffness controlling electrode is similar to that of the effective stiffness controlling electrodes in FIG. 2A. The effective stiffness controlling electrodes 118 are shaped into fingers, and inserted between the moving electrodes 117 of the inertial object 113. A power supplier 120 supplies a voltage between the effective stiffness controlling electrodes 118 and the moving electrodes 117, thereby generating electric force. Since the effective stiffness controlling electrodes 118 have the predetermined shapes, the electric force applied between the moving electrodes 117 and the effective stiffness controlling electrodes 118 varies linearly according to the displacement of the inertial object 113.

FIG. 11 illustrates an actuator 310 employing the vibratory structure of FIG. 6. An inertial object 132 is supported by support ends 131 via elastic members 139, and detached from a base substrate (not shown) by a predetermined distance. Finger-shaped electrodes 134 are attached to both sides of the inertial object 132, and finger-shaped exciting electrodes 136 formed at support ends 135 are inserted between the driving electrodes 134. A voltage applied between the driving electrodes 134 and the exciting electrodes 136 moves the inertial object 132 along the X-axis. The driving electrodes 134 and the exciting electrodes 136 can be substituted for each other as means for detecting the two-dimensional movement of the inertial object 132.

Slits 133 are formed in the inertial object 132. Here, effective stiffness controlling electrodes 137 are fixed to the substrate, under the slits 133. The effective stiffness controlling electrodes 137 are squares each formed of triangles whose base sides contact with each other. The triangles are preferable isosceles triangles. A voltage is applied between the inertial object 132 and the effective stiffness controlling electrodes 137 by a power supplier 138. When the inertial object 132 vibrates along the X-axis, a portion in which the inertial object 132 overlaps with the effective stiffness controlling electrodes 137 is always triangular.

FIG. 12 illustrates an actuator in which an inertial object rotatingly vibrates. An inertial object 153 is circular, and supported by support ends 151 at every angle of 90° via elastic members 152. The inertial object 153 is detached from a base substrate (not shown) by a predetermined distance. The inertia object rotatingly vibrates by an exciter (not shown). Slits 154 are formed in the inertia object 153, and under the slits 154 are fixed effective stiffness controlling electrodes 155 to the substrate. A power supplier 157 applies a voltage between the inertial object 153 and the effective stiffness controlling electrodes 155.

In this embodiment, the slits 154 are at an angle 180° with the center of the inertial object 153 as a basis. Each of the effective stiffness controlling electrodes 155 arranged under the slits 154 is a square formed of triangle whose basis sides are in contact with each other. When the inertial object 153 rotatingly vibrates, the inertial object overlaps with the effective stiffness controlling electrodes 155 in a triangle.

The vibratory structure of the present invention has many exemplary applications besides an actuator (e.g., sensor, accelerometer or gyroscope). As described above, moving electrode and effective stiffness controlling electrodes are formed into a predetermined shape, and electric force between both the electrodes linearly varies with the displacement of an inertial object. Therefore, the effective stiffness of a vibration system is not affected by the displacement of the inertial object, and the natural frequency of the vibration system can be controlled simply by varying an applied voltage. The sensitivity or operational range of a sensor, an actuator, or an accelerometer employing this vibratory structure can be freely modified by a user. Especially in a bi-axial vibratory structure such as a gyroscope, it is very easy to tune the natural frequencies of two axes, simply by changing an applied voltage, without modifying the vibratory structure itself.

The foregoing description of the present invention has been limited to the above embodiments. It will be apparent, however, that variations and modifications may be made to the invention by anyone skilled in the art. Therefore, it is the object of the appended claims to cover all such variations and modification as come within the true spirit and scope of the invention.

What is claimed is:

1. A vibratory structure comprising:
    an elastic member one end portion of which is connected to a first support end and having an elastic force;
    an inertial object vibrating by the elastic force of said elastic member;
    a moving electrode attached to said inertial object;
    an effective stiffness controlling electrode connected to a second support end; and
    a power supplier generating electric force between said moving electrode and said effective stiffness controlling electrode, wherein said electric force linearly varies according to the displacement of said inertial object.

2. A vibratory structure as claimed in claim 1, wherein said moving electrode and said effective stiffness controlling electrode include elongated portions with one elongated portions of one electrode inserted adjacent to elongated portions of the other electrode, said elongated portion of said effective stiffness controlling electrode includes a curved portion extending for a length of $x_1$ from said second support end and a linear portion extending from the end of said curved portion to an end portion, and wherein, with respect to the displacement x of said inertial object, the distance s between said moving electrode and said curved portion of said effective stiffness controlling electrode is given by $$s = s_0 \frac{1}{1+\left(\frac{s_0}{s_1}-1\right)\frac{x}{x_1}},$$

where $s_0$ indicates the distance between said moving electrode and said linear portion of said effective stiffness controlling electrode, and $s_1$ denotes the distance between said effective stiffness controlling electrode on said second support end and said moving electrode.

3. A vibratory structure as claimed in claim 1, wherein said moving electrode includes a rod having a radius of $r_1$ and said effective stiffness controlling electrode includes a cylinder which is hollow and has an annular section, said moving electrode being inserted into said effective stiffness controlling electrode, and wherein with respect to the displacement x of said inertial object, the difference s between the radius of the inner hollow circle of said effective stiffness controlling electrode and the radius $r_1$ of said moving electrode is given by $$s = \frac{1}{\left(\frac{1}{s_1} - \frac{1}{s_0}\right)\frac{x}{x_1} + \frac{1}{s_0}}$$

where $x_1$ indicates the whole length of said cylinder of said effective stiffness controlling electrode and $s_0$ and $s_1$ indicate the differences between the radius $r_1$ of said rod of said moving electrode and radii of an inner surface of said cylinder of said effective stiffness controlling electrode on the end portion support end, respectively.

4. A vibratory structure as claimed in claim 1, wherein said moving electrode and said effective stiffness controlling electrode each include a plurality of fingers intermeshed with each other, each finger of said effective stiffness controlling electrode is of the same length, and the fingers of said moving electrode vary in length and include end portions which are in a straight line, and linearly symmetrical with respect to the longitudinal direction of the longest finger of said moving electrode.

5. A vibratory structure as claimed in claim 1, wherein said moving electrode and said effective stiffness controlling electrode include plates and spaced by a predetermined distance from each other and are in parallel, and said moving electrode overlaps said effective stiffness controlling electrode in a triangle section.

6. A vibratory structure as claimed in claim 5, wherein said portion of said moving electrode which overlaps said effective stiffness controlling electrode has the shape of an isosceles triangle.

7. A vibratory structure as claimed in claim 1, wherein said inertial object includes a plate having at least one slit, said effective stiffness controlling electrode includes a plate, said inertial object being spaced from and parallel to said effective stiffness controlling electrode by a predetermined distance, and said inertial object overlapping said effective stiffness controlling electrode in a portion having a triangle shape.

8. A vibratory structure as claimed in claim 1, wherein said inertial object includes a plate having at least one slit, said effective stiffness controlling electrode includes a plate, said inertial object being spaced from and parallel to said effective stiffness controlling electrode by a predetermined distance, and said slit of said inertial object overlapping said effective stiffness controlling electrode in a portion having a triangle shape.

9. A vibratory structure as claimed in claim 1, wherein said moving electrode includes a plurality of fingers each having a triangular end portion, and spaced from one another by a predetermined distance, said effective stiffness controlling electrode includes a plurality of fingers and spaced from one another by a predetermined distance, and the fingers of said moving electrode and said effective stiffness controlling electrode being mutually intermeshed.

10. A method for controlling the natural frequency of a vibratory structure comprising: an elastic member one end portion of which is connected to a first support end and having an elastic force; an inertial object vibrating by the elastic force of said elastic member; a moving electrode formed into a first predetermined shape and attached to said inertial object; an effective stiffness controlling electrode connected to a second support end and formed into a second predetermined shape; and a power supplier for generating electric force between said moving electrode and said effective stiffness controlling electrode, wherein said electric force linearly varies according to the displacement of said inertial object, and thus the natural frequency of said vibratory structure is controlled by changing the voltage applied between said moving electrode and said effective stiffness controlling electrode.

11. An actuator comprising:

an elastic member one end of which is connected to a support end and having an elastic force;

an inertial object vibrating by the elastic force of said elastic member;

means for vibrating said inertial object and detecting the vibration of said inertial object;

a moving electrode formed into fingers at one side of said inertial object;

an effective stiffness controlling electrode formed into fingers to be inserted with said moving electrode; and a power supplier for applying a voltage to generate electric force between said moving electrode and said effective stiffness controlling electrode, wherein said electric force linearly varies according to the displacement of said inertial object.

12. An actuator comprising:

an elastic member one end portion of which is supported by a support end and having an elastic force;

an inertial object formed into a plate, for vibrating by the elastic force of said elastic member and having at least one slit;

means for exciting said inertial object and detecting the vibration of said inertial object;

at least one effective stiffness controlling electrode formed into a plate, spaced from and parallel to said inertial object by a predetermined distance, and overlapping said inertial object in a portion having a triangle shape;

and a power supplier for applying a predetermined voltage between said inertial object and said effective stiffness controlling electrode.

13. An actuator comprising:

an elastic member one end portion of which is supported by a support end and having an elastic force;

an inertial object shaped into a circular plate and having at least one slit, for rotating by the elastic force of said elastic member;

means for exciting said inertial object and detecting the vibration of said inertial object; and at least one effective stiffness controlling electrode spaced from and parallel to said inertial object by a predetermined distance, and overlapping said inertial object in a portion having a triangle shape.

* * * * *